United States Patent

[11] 3,627,428

[72] Inventor Truman G. Bergman
China Lake, Calif.
[21] Appl. No. 50,515
[22] Filed June 29, 1970
[45] Patented Dec. 14, 1971
[73] Assignee The United States of America as
represented by the Secretary of the Navy

[54] OPTICAL QUADRATURE
6 Claims, 2 Drawing Figs.

[52] U.S. Cl.................................................... 356/141,
250/203, 350/202, 350/213, 356/172
[51] Int. Cl...................................................... G01b 11/26
[50] Field of Search............................................ 356/141,
152, 172; 250/203; 350/202, 213, 96 OT

[56] References Cited
UNITED STATES PATENTS
3,422,267 1/1969 Kallet et al..................... 250/203
3,133,200 5/1964 Collyer........................... 250/203
3,383,512 5/1968 Unruh............................. 356/114
2,921,757 1/1960 Houle............................. 250/203

Primary Examiner—Ronald L. Wibert
Assistant Examiner—J. Rothenberg
Attorneys—R. S. Sciascia and Roy Miller ABSTRACT: A lens assembly and associated detectors for providing directional information concerning the location of a source of light with respect to the system optical axis comprising a lens system for separating light rays entering therein into quadrants, a focusing lens for focusing light rays on the lens system and detectors positioned with respect to the lens system such that the separated light rays impinge on the detectors and the outputs of the detectors provide directional information with respect to the system optical axis.

PATENTED DEC 14 1971 3,627,428

INVENTOR.
TRUMAN G. BERGMAN
BY
ROY MILLER, ATTORNEY.

OPTICAL QUADRATURE

GOVERNMENT INTEREST

The invention described herein may be manufactured and used by or for the Government of the United States of America for governmental purposes without the payment of any royalties thereon or therefor.

BACKGROUND OF THE INVENTION

The lens assembly and detectors hereinafter described, when used with an appropriately designed telescope, provide directional information concerning the location of a light source with respect to the system optical axis. Specifically, the field-of-view is divided into quadrants and the quadrant in which the target lies is indicated.

The usual method for accomplishing the above is to have the light impinge on a detector which has been divided electrically into quadrants. This has several disadvantages. The detector area has to be large enough to include the entire field-of-view, thereby resulting in a slow response time. It is also difficult to sufficiently isolate the quadrants electrically and the large range of angles of the incoming rays renders effective use of an interference filter difficult. In addition, it is sometimes difficult to match the response of all four quadrants of the detector. Further, the large area and peculiar shape of each quadrant does not allow use of high-performance avalanche detectors. Finally, there is a large "dead zone" between the quadrants which is made necessary by the construction techniques employed.

DESCRIPTION OF THE INVENTION

Figure 1:
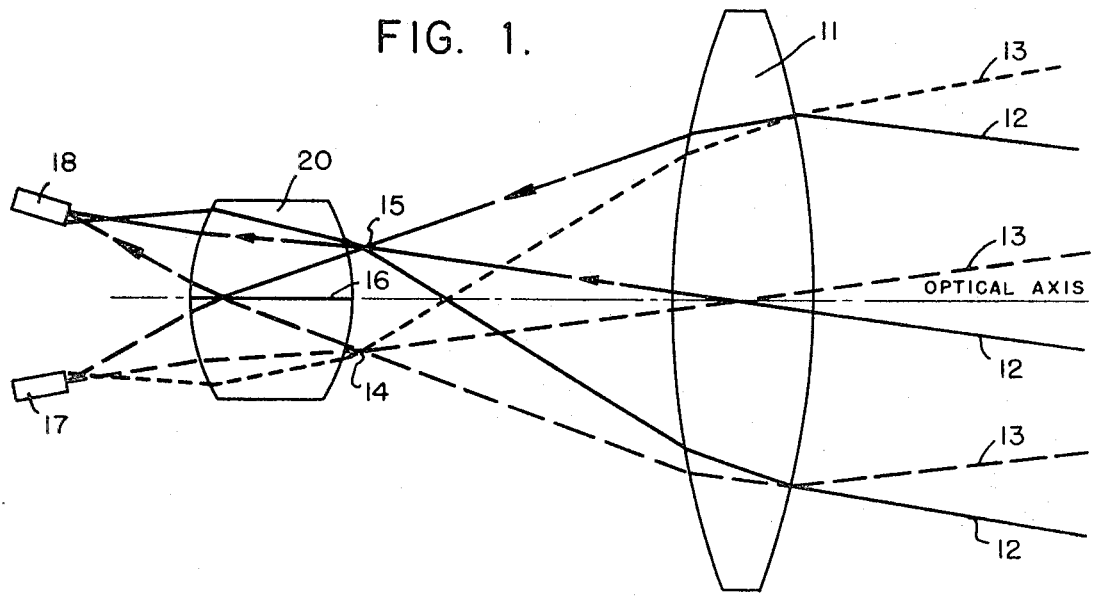
FIG. 1 is a side elevation illustrating the invention.

FIG. 1 is a side elevation illustrating one mode of implementating the invention. Light rays 12 represent rays coming from a source below the optical axis of the system and light rays 13 represent those rays coming from a source above the optical axis. It is to be understood that the system is constructed such that light rays coming from the right and left of the optical axis in azimuth would be treated correspondingly. The light rays 12 and 13 pass through a focusing lens 11 and are focused on a lens assembly 20.

Fourteen represents the focus of the telescope lens 11 for those light rays labeled 13 while 15 represents the focus of the telescope lens 11 for those light rays labeled 12.

The lens assembly 20 is a double convex lens which is separated into four quadrants and the common surfaces of each quadrant are mirrored as at 16 to provide total reflection. It is to be understood that the quadrant common surfaces may also be designed to provide total internal reflection without mirroring.

After the light is separated in the lens system 20 those light rays labeled 13 are directed to a detector 17 while those light rays labeled 12 are directed to a detector 18. The defectors 17 and 18 comprise materials chosen to be responsive to the particular light spectrum involved.

Figure 2:
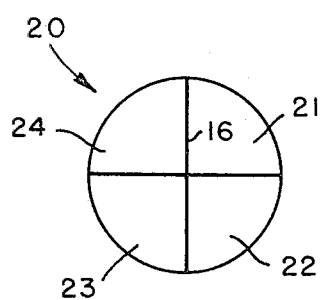
FIG. 2 is a front view of the lens assembly.

FIG. 2 is a front elevation of the lens assembly comprising the four quadrants 21, 22, 23 and 24. The common surfaces are mirrored as at 16 to provide totally internal reflection of light rays directed thereon.

An interference filter (not shown) may be placed in front of each detector just in front of the blur circle if desired.

The front surface of the lens assembly 20 is placed near the focus of the telescope lens 11 (which is where the quadrant detector is placed in the prior method). Light focused on one of the quadrants is then refracted and reflected toward another focus where the detectors are placed. Note that the rays coming to a focus at the first surface of the lens assembly 20 form a much larger range of angles than those exiting from the second surface of the lens assembly. This allows an interference filter to be placed in front of each detector where it was not possible before since interference filters do not work properly over such a wide range of incident angles.

The lens assembly 20 may be broken down into component functions, (a) the mirror 16 and (b) the index of the lens and curvatures. The mirror surfaces themselves have two functions. First, the mirrors separate all rays entering in one quadrant from those in the other three. Second, they divide the range of angles of the incoming fan of rays by half at the expense of a doubling of the effective entrance aperture. The lens index and curvature serve to bring the rays together and to further decrease the range of angles.

If desired, a field lens or immersion dome may be used to further decrease the blur circle existing at the focus of the light rays after they exit from the lens assembly 20.

In a specific example, a double-convex lens with an index of refraction of 1.755, both radii equal to 0.50 inch, a thickness of 0.50 inch and zero displacement from the optical axis of the system was used for the lens assembly 20.

The present invention is a system which allows the use of interference filters, almost eliminates the "dead zone" and eliminates "crosstalk." In addition, the system allows one to use a much smaller detector area and reduces the problem of obtaining uniform sensitivity throughout the field-of-view.

What is claimed is:

1. A lens and detector assembly for providing directional information concerning the location of a radiating source with respect to the assembly optical axis comprising;

focusing lens means in the path of rays emitted by a radiating source for focusing said rays;

detector means having at least two separate portions for receiving said rays after passing through said focusing lens and so constructed and arranged that the direction of a radiating source is indicated when rays impinge on a particular one of said portions of said detector means;

separator lens means positioned between said focusing lens means and said detector means and so constructed that the separator lens means has at least two separate and distinct portions optically;

one of said at least two separate portions of said detector means being associated with one and only one of said at least two portions of said separator lens means;

the other of said at least two separate portions of said detector means being only associated with the other of said at least two portions of said separator lens means;

said focusing lens means and separator lens means having coincident optical axes;

said separator lens means being constructed such that rays from a radiating source on one side of the optical axis will impinge on one of said at least two separate portions of said detector means exclusive of the other of said at least two separate portions of said detector means and vice versa with respect to rays from a radiating source on another side of the optical axis.

2. A lens and detector assembly as set forth in claim 1 wherein;

said separator lens means is divided into quadrant portions which operate to separate rays impinging thereon exclusively in accordance with whether the source of rays is above, below, right or left of the optical axis and wherein said detector means comprises four separate portions; and wherein one each of said portions of said detector means is associated exclusively with a single quadrant of said separator lens means.

3. A lens and detector assembly as set forth in claim 1 wherein;

said separator lens means comprises a double convex lens wherein the common surface of said at least two portions totally internally reflects rays impinging thereon.

4. A lens and detector assembly as set forth in claim 1 wherein;

the common surface of said at least two portions of said separator lens means is silvered to provide a mirror surface so that all rays impinging thereon are totally reflected.

5. A lens and detector assembly as set forth in claim 2 wherein;

the common surfaces of the quadrant portions of said separator lens means totally internally reflect rays impinging thereon.

6. A lens and detector assembly as set forth in claim 2 wherein;

the common surfaces of the quadrant portions of said separator lens means are silvered to provide mirror surfaces so that all rays impinging thereon are totally reflected.

* * * * *